(12) United States Patent
Kersey et al.

(10) Patent No.: US 7,062,126 B2
(45) Date of Patent: Jun. 13, 2006

(54) TUNABLE OPTICAL FILTER HAVING LARGE DIAMETER OPTICAL WAVEGUIDE WITH BRAGG GRATING AND BEING CONFIGURED FOR REDUCING THE BULK MODULUS OF COMPRESSIBILITY THEREOF

(76) Inventors: Alan D. Kersey, 75 Taylor Town Rd., Glastonbury, CT (US) 06073; Mark R. Fernald, 35 Tayler Rd., Enfield, CT (US) 06082; Timothy J. Bailey, 703 Maple Rd., Longmeadow, MA (US) 01106; Michael A. Davis, 172 Stevens La., Glastonbury, CT (US) 06033; Thomas W. Engel, 14 Lakeview St., East Hampton, CT (US) 06424; Robert N. Brucato, 268-1 Scott Rd., Waterbury, CT (US) 06705; Richard T. Jones, 131 Tanglewood Dr., Hamden, CT (US) 06518; Trevor W. MacDougall, 32 Elaine Dr., Simsbury, CT (US) 06070; Matthew B. Miller, 140 Deerfield Dr., Glastonbury, CT (US) 06033; Paul E. Sanders, 1 Centre Village, Madison, CT (US) 06443; James S. Sirkis, 6 Bartholomew La., Wallingford, CT (US) 06492; James M. Sullivan, 8 Terp Rd., East Hampton, CT (US) 06424; Martin A. Putnam, 78 Lancaster Way, Cheshire, CT (US) 06410

( * ) Notice: Subject to any disclaimer, the term of this patent is extended or adjusted under 35 U.S.C. 154(b) by 19 days.

(21) Appl. No.: 10/453,880

(22) Filed: Jun. 2, 2003

(65) Prior Publication Data

US 2004/0042726 A1    Mar. 4, 2004

Related U.S. Application Data

(60) Provisional application No. 60/387,174, filed on Jun. 7, 2002.

(51) Int. Cl.
*G02B 6/34* (2006.01)
(52) U.S. Cl. .............................. 385/37; 385/13; 385/27; 385/125
(58) Field of Classification Search .................. 385/30, 385/37, 123, 126, 127, 142, 146; 372/6
See application file for complete search history.

(56) References Cited

U.S. PATENT DOCUMENTS

| 4,046,537 | A | | 9/1977 | Deserno et al. ................... 65/2 |
|---|---|---|---|---|
| 5,691,999 | A | | 11/1997 | Ball et al. ...................... 372/20 |
| 5,828,059 | A | * | 10/1998 | Udd ............................ 356/32 |
| 5,841,131 | A | | 11/1998 | Schroeder et al. ..... 250/227.17 |
| 6,201,912 | B1 | | 3/2001 | Kempen et al. ................ 385/37 |
| 6,229,827 | B1 | * | 5/2001 | Fernald et al. ................ 372/20 |
| 2002/0041724 | A1 | | 4/2002 | Ronnekleiv et al. .......... 385/12 |
| 2004/0037485 | A1 | * | 2/2004 | Kersey ....................... 385/12 |

FOREIGN PATENT DOCUMENTS

| EP | 0 918 244 A1 | 5/1999 |
|---|---|---|
| WO | WO 99/32863 | 7/1999 |
| WO | WO 00/37969 | 6/2000 |

* cited by examiner

*Primary Examiner*—Michelle Connelly-Cushwa
*Assistant Examiner*—Omar Rojas (57) ABSTRACT

A tunable optical filter has a large diameter cane waveguide with "side-holes" in the cane cross-section that reduce the force required to compress the large diameter optical waveguide without overly compromising the buckling strength thereof. The large diameter optical waveguide has a cross-section of at least about 0.3 millimeters, including at least one inner core, a Bragg grating arranged therein, a cladding surrounding the inner core, and a structural configuration for providing a reduced bulk modulus of compressibility and maintaining the anti-buckling strength of the large diameter optical waveguide. The structural configuration reduces the cross-sectional area of the large diameter optical waveguide. These side holes reduce the amount of glass that needs to be compressed, but retains the large diameter.

37 Claims, 8 Drawing Sheets

TUNABLE OPTICAL FILTER HAVING LARGE DIAMETER OPTICAL WAVEGUIDE WITH BRAGG GRATING AND BEING CONFIGURED FOR REDUCING THE BULK MODULUS OF COMPRESSIBILITY THEREOF

CROSS-REFERENCE TO RELATED APPLICATIONS

This application claims benefit to provisional patent application Ser. No. 60/387,174, filed Jun. 7, 2002.

This application also claims benefit to application Ser. No. 09/455,868, filed Dec. 6, 1999; application Ser. No. 09/699,940 filed Oct. 30, 2000, which is a continuation-in-part of application Ser. No. 09/519,240, filed Mar. 6, 2000, now abandoned; and application Ser. No. 10/146,773, filed May 16, 2002, which is a continuation-in part of application Ser. No. 09/707,084, filed Nov. 6, 2000, which is a continuation of application Ser. No. 09/691,997, filed Oct. 19, 2000, issued as U.S. Pat. No. 6,363,089, which is a continuation of application Ser. No. 09/456,112, filed Dec. 6, 1999, issued as U.S. Pat. No. 6,229,827, which is a continuation-in-part of application Ser. No. 09/400,362, filed Sep. 20, 1999, now abandoned, which is a continuation-in-part of application Ser. No. 09/205,846, filed Dec. 4, 1998, now abandoned; which are all hereby incorporated by reference in their entirety.

BACKGROUND OF THE INVENTION

1. Technical Field

The present invention generally relates to an optical component; and more particularly to a tunable optical filter for filtering an optical signal using compression based tuning.

2. Description of Related Art

Bragg gratings have been utilized in a variety of applications that require a tunable optical filter. These filtering devices are inherently sensitive to both the applied strain and temperature, both of which have been used successfully to precisely tune the filters. The large diameter optical waveguide or cane-based tunable device provides a high level of grating control by enabling precise grating tunability through compression tuning while maintaining high reliability in the overall device. One important feature of the cane-based tunable grating is its ability to tune over an extended region compared to a fiber technique.

However, in such devices, the tuning range is limited and is set by the buckling strength of the grating region. A simple range extending technique could be to simply thicken the grating region; however, this requires more force to be placed on the device to achieve the same wavelength shift. If one looks at a device required to tune a typical 50 Gigahertz (GHz) grating over the entire C-Band (40 nanometer (nm)). A 7 millimeter (mm) long grating will buckle at about 500 lbs of applied force in the above configuration if the center diameter is 1.1 mm; this 500 lbs will also give the required 40 nm tuning range. Since in this example the element will break once it reaches the full tuning range, an additional safety factor needs to be applied, typically greater than 2. One can then see that the forces required to produce this device are unreasonable.

There is a need in the industry to provide a tunable optical filter using a Bragg grating that overcomes this problem.

SUMMARY OF THE INVENTION

In its broadest sense, the present invention provides a new and unique tunable optical filter having a large diameter optical waveguide or cane with a cross-section of at least about 0.3 millimeters. The large diameter optical waveguide or cane features at least one inner core with a Bragg grating arranged therein; a cladding surrounding the at least one inner core; and a structural configuration for reducing the bulk modulus of compressibility and maintaining the anti-buckling strength of the large diameter optical waveguide. The structural configuration reduces the cross-sectional area of the large diameter optical waveguide. In effect, the new tunable optical filter uses a large diameter optical waveguide or cane geometry with "side-holes" in the cane cross-section that reduce the force required to compress the waveguide without overly compromising the buckling strength of the cane.

In one embodiment, the structural configuration includes two or more side holes arranged in relation to the core of the large diameter optical waveguide and dimensioned for maintaining anti-buckling strength of the large diameter optical waveguide. The side holes are symmetrically arranged about the inner core, may extend completely or partially through the large diameter optical fiber, and may be circular or non-circular. In particular, four side holes may be used that are symmetrically arranged about the inner core.

In another embodiment, the structural configuration includes a honeycomb structure having a multiplicity of side holes arranged about the core and extending through the large diameter optical waveguide. The multiplicity of side holes are symmetrically arranged about the core. The cross-section area in this case would be reduced by greater than 50%, giving rise to a highly robust tuning element.

In another embodiment, the structural configuration includes two or more fin-like structures etched or ground and extending radially from the cladding of the large diameter optical waveguide and dimensioned for maintaining anti-buckling strength of the large diameter optical waveguide. The fin-like structures are symmetrically arranged about the inner core, and extend completely or partially along the large diameter optical fiber. The large diameter optical fiber may be shaped like a dogbone having a narrower intermediate section arranged between wider end sections, and the narrower intermediate section includes the fin-like structures arranged thereon. In particular, four fin-like structures are used that are symmetrically arranged and extending from the core.

The structural configuration includes a wheel-like structure having two or more inner spoke sections extending radially from the cladding with openings therebetween and an outer rim section circumferentially connecting the inner spoke sections. In particular, four inner spoke sections are used that are symmetrically arranged and extending from the core.

In effect, the present invention provides an approach that has good buckling strength while reducing the effective modulus of the cane. This is accomplished by reducing the cane cross-sectional area by fabricating a cane waveguide with side holes. These side holes reduce the amount of glass that needs to be compressed, but retains the large diameter.

The invention also includes embodiments in which more than one core is arranged about one or more holes. For example, the at least one inner core may include a pair of inner cores symmetrically arranged about the structural configuration for reducing the bulk modulus. The pair of inner cores have a respective Bragg grating written therein.

The structural configuration for reducing the bulk modulus may also include a honeycomb of holes and the at least one inner core includes a pair of inner cores symmetrically arranged about honeycomb of holes; or the structural configuration for reducing the bulk modulus may include a clover leaf of three holes and the at least one inner core may include three inner cores symmetrically arranged about clover leaf of holes; or the structural configuration for reducing the bulk modulus may include a tubular hole and the at least one inner core may include a pair of inner cores symmetrically and diametrically arranged about the tubular hole; or the structural configuration for reducing the bulk modulus may include four holes and the at least one inner core may include four inner cores symmetrically and diametrically arranged about the four holes.

The present invention also includes a method for manufacturing any one or more of the aforementioned designs.

The foregoing and other objects, features and advantages of the present invention will become more apparent in light of the following detailed description of exemplary embodiments thereof.

BRIEF DESCRIPTION OF THE DRAWING

The drawing, not drawn to scale, include the following Figures:

FIG. 7 includes FIGS. 7(a), 7(b) and 7(c); FIG. 7(a) is a diagram of an embodiment of a large diameter optical waveguide having multiple holes with a honeycomb design and multiple cores with Bragg grating written therein; FIG. 7(b) is a diagram of an embodiment of a large diameter optical waveguide having multiple holes with a clover leaf design and multiple cores with Bragg grating written therein; and FIG. 7(c) is a diagram of an embodiment of a large diameter optical waveguide having a tubular hole and multiple cores with Bragg grating written therein.

BEST MODE FOR CARRYING OUT THE INVENTION

Figure 1:
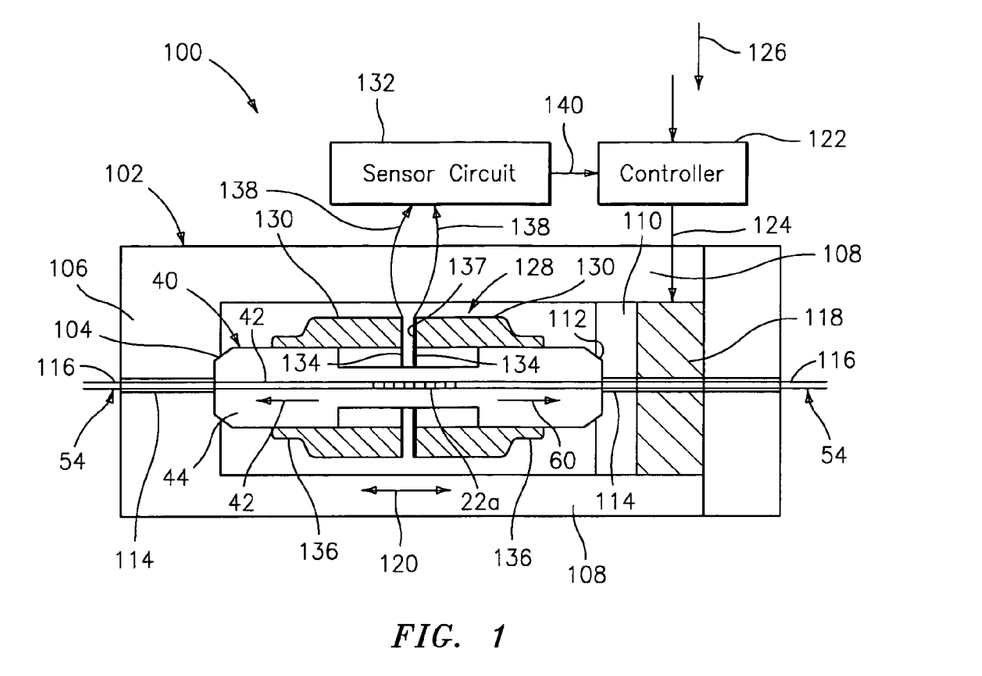
FIG. 1 is a view of a tunable device having a positional/force feedback control circuit in accordance with the present invention.

FIG. 1: Compression Tuning and Position Feedback Control

FIG. 1 shows a tunable optical filter 100 that compresses axially a large diameter optical waveguide 40 using a non-optical closed control loop. The tunable optical filter 100 may be adapted for tuning any of the large diameter optical waveguides discussed below, and is similar to that disclosed in co-pending U.S. Patent Application Ser. No. 09/707,084 entitled "Compression-Tuned Bragg Grating and Laser", application Ser. No. 09/205,845, application Ser. no. 455,865, filed Dec. 6, 1999, application Ser. No. 10/146,773, filed May 16, 2000, as well as the aforementioned co-pending U.S. patent application Ser. No. 09/455,868, all which are hereby incorporated herein by reference in their entirety. The tunable optical filter 100 operates as follows:

The tunable optical filter 100 compresses axially the large diameter optical waveguide 40 within a housing 102. One end of the large diameter optical waveguide 40 is pressed against a seat 104 in one end 106 of the housing 102. The housing 102 also has a pair of arms (or sides) 108, which guide a movable block 110. The block 110 has a seat 112 that presses against the other end of the large diameter optical waveguide 40. The axial end faces of the large diameter optical waveguide 40 and/or the seats on mating surfaces 104, 112 may be plated with a material that reduces stresses or enhances the mating of the large diameter optical waveguide 40 with the seat on the mating surfaces. The ends of the housing 102 and the block 110 have a bore 114 drilled through them to allow the fiber 116 to pass therethrough. Instead of the recessed seats 104, 112, the end 106 of the housing 102 and the block 110 may provide a planar surface for engaging flush with the respective ends of the large diameter optical waveguide 40.

The housing 102 may be assembled such that a pre-strain or no pre-strain exists on the large diameter optical waveguide 40 prior to applying any outside forces.

An actuator 118, such as a piezoelectric transducer actuator, engages the moveable block 110, which causes the block 110 to move as indicated by arrows 120. Accordingly, the PZT actuator 118 provides a predetermined amount of force to the moving block 110 to compress the large diameter optical waveguide 40, and thereby tune the grating 22a to a desired reflection wavelength. In response to a control signal generated by a displacement control circuit or controller 122 via conductor 124, the PZT actuator 118 is energized to provide the appropriate is compression force necessary to tune the grating 22a to the desired Bragg reflection wavelength. The control circuit 122 adjusts the expansion and retraction of the actuator 118 in response to an input command 126 and a displacement sensor 128 that provides feedback representative of the strain or compression of the large diameter optical waveguide 40 to form a non-optical closed-loop control configuration. In other words, the light propagating through the network or device is not used to provide feedback for the tuning of the grating 22a.

Figure 4:
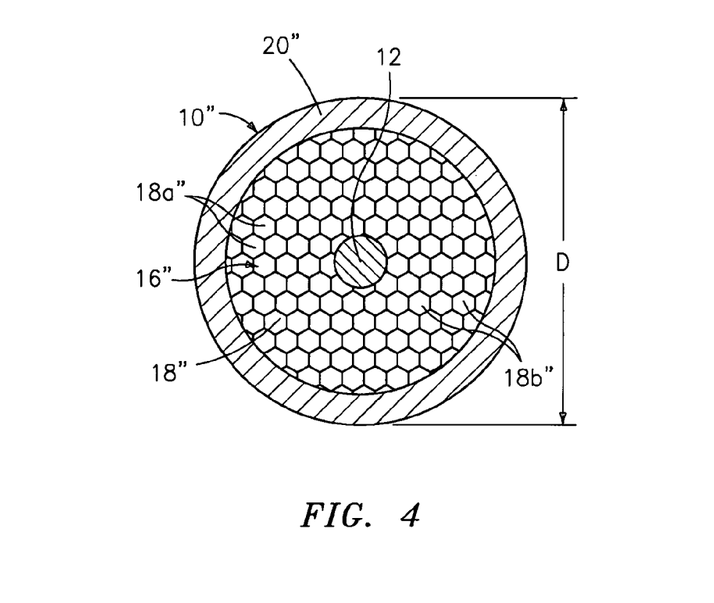
FIG. 4 is a diagram of another embodiment of a large diameter optical waveguide having a multiplicity of side holes in the form of a honeycomb that is the subject matter of the present invention.

In one embodiment, the displacement sensor 128 includes a pair of capacitive elements 130 and a known displacement sensor circuit 132, similar to that disclosed in co-pending U.S. patent application Ser. No. 09/519,802, entitled, "Tunable Optical Structure Featuring Feedback Control", filed Mar. 6, 2000, which is incorporated herein by reference in its entirety. As shown in FIG. 4, each capacitive element 130 is generally tubular having an annular capacitive end surface 134. The capacitive elements 130 may be formed of glass, plastic or other material. The capacitive elements 130 are mounted, such as by welding or epoxy, to respective ends 136 of the large diameter optical waveguide 40 such that the capacitive surfaces 134 are spaced a predetermined distance apart, for example, approximately 1–2 microns. Other spacings may be used if desired. The capacitive elements 130 may be bonded or secured using an epoxy or other adhesive compound, or fused to large diameter optical waveguide 40 using a $CO_2$ laser or other heating element. The capacitive surfaces 134 are coated with a metallic coating, such as gold, to form a pair of annular capacitive plates 137. The change in capacitance depends on the change in the spacing between the capacitive plates.

Electrodes 138 are attached to the capacitive plates 137 to connect the capacitor to the displacement sensor circuit 132. The sensor circuit 132 measures the capacitance between the capacitive plates and provides a sensed signal 140, indicative of the measured capacitance, to the displacement controller 122. As the large diameter optical waveguide 40 is strained, the gap between the parallel capacitive surfaces or plates 134 will vary, thereby causing the capacitance to change correspondingly. Specifically, as the grating is compressed, the gap between the capacitive surfaces or plates 134 is reduced, resulting in an increase in capacitance. The change in capacitance is inversely proportional to the change in the reflection wavelength $\lambda_b$ of the grating 22a. Since the capacitive elements 130 are directly connected to the large diameter optical waveguide 40, the capacitive elements are passive and will not slip, One skilled in the art would be able to implement without undue experimentation, the sensor electronics circuit 132 to measure the change in capacitance between the two capacitive surfaces or plates 134.

In the operation of the tunable optical filter 100, the controller 122 receives the wavelength input signal 126, which represents the desired reflection wavelength to tune the grating unit. In response to the input signal 126 and the sensed signal 140, which is representative of the present reflection wavelength of the grating 22a, the controller 122 provides a control signal 124 to the actuator 118 to increase or decrease the compression force applied to the large diameter optical waveguide 40 to set the desired reflection wavelength of the grating 22a. The change in applied force to the large diameter optical waveguide 40 changes the spacing between the ends of the grating 22a, and therefore, the spacing between the capacitive plates. As described above, the change in spacing of the capacitive plates changes the capacitance therebetween provided to the sensor circuit 132, which provides displacement feedback to the controller 122. While the sensor circuit 132 and the controller 122 has been shown as two separate components, one would recognize that the functions of these components may be combined into a single component. One example of a closed loop actuator 118 that may be used is Model No. CM (controller) and DPT-C-M (for a cylindrical actuator) made by Queensgate, Inc. of N.Y.

Although the invention has been described with respect to using a capacitor 128 to measure the gap distance) it should be understood by those skilled in the art that other gap sensing techniques may be used, such as inductive, optical, magnetic, microwave, time-of-flight based gap sensors, as disclosed by way of example in U.S. patent application Ser. No. 10/390,073, filed Mar. 17, 2003, which is hereby incorporated by reference in its entirety. See also U.S. Pat. No. 6,563,968, which is also hereby incorporated by reference in its entirety. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of a large diameter optical waveguide 40, one should recognize that the tuning devices may be accurately and repeatably compressed and thus may operate in an open loop mode.

Alternatively, instead of using a piezoelectric actuator 118, the large diameter optical waveguide 40 may be compressed by another actuator, such as a solenoid, pneumatic force actuator, or any other device that is capable of directly or indirectly applying an axial compressive force on the large diameter optical waveguide 40. Further, a stepper motor or other type of motor whose rotation or position can be controlled may be used to compress the waveguide. A mechanical linkage connects the motor, e.g., a screw drive, linear actuator, gears, and/or a cam, to the movable block 110 (or piston), which causes the block to move as indicated by arrows 120, similar to that described in pending U.S. patent application Ser. No. 09/751,589 entitled, "Wide Range Tunable Optical Filter", filed Dec. 29, 2000; and U.S. patent application Ser. No. 09/752,332 entitled, "Actuator Mechanism for Tuning an Optical Device", filed Dec. 29, 2000, which are incorporated herein by reference. The stepper motor may be a high resolution stepper motor driven in a microstepping mode, such as that described in the aforementioned U.S. Pat. No. 5,469,520, entitled "Compression Tuned Fiber Grating", to Morey et al., (e.g., a Melles Griot NANOMOVER), incorporated herein by reference.

Alternatively, the grating 22a may be tuned by mechanically stressing (i.e. tension, bending) the grating elements, or varying the temperature of the grating (i.e., using a heater), such as that described in U.S. Pat. No. 5,007,705 entitled, "Variable Optical Fiber Bragg Filter Arrangement", to Morey et al., which is incorporated herein by reference.

The scope of the invention is intended to include embodiments using one multi-cores instead of one cores.

Figure 2:
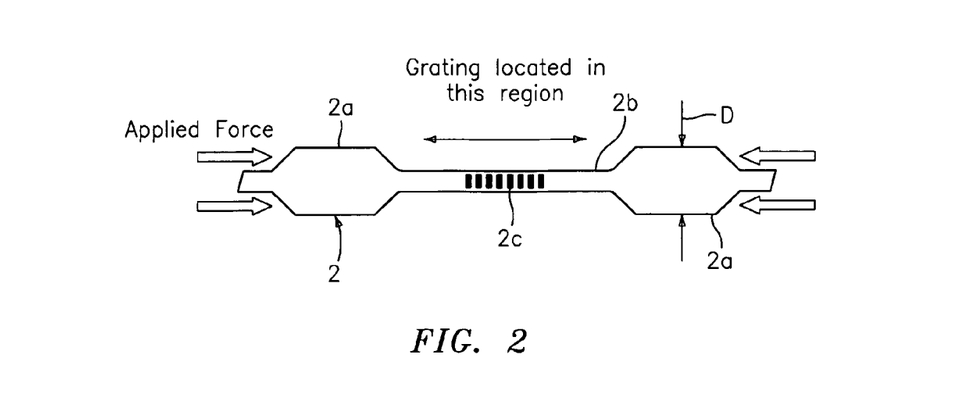
FIG. 2 is a diagram of a large diameter optical waveguide that forms part of the subject matter of the present invention.
Figure 2A:
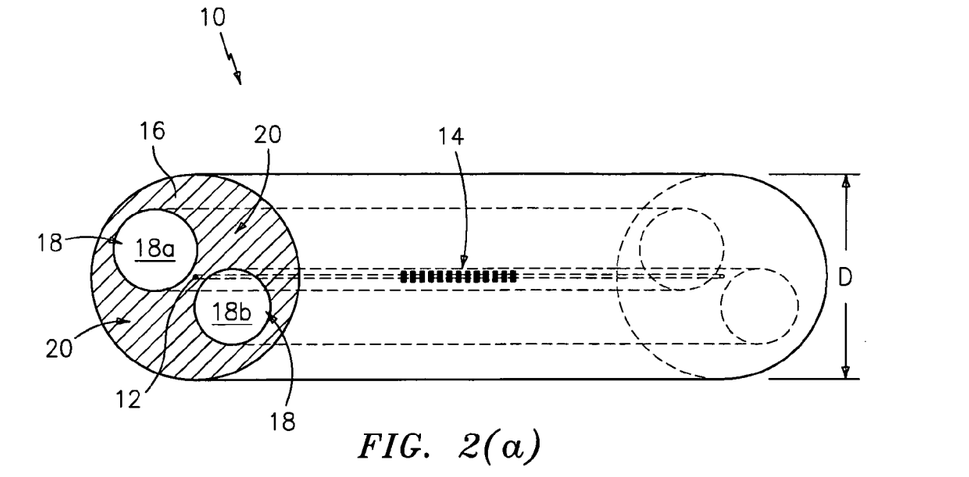
FIG. 2a is a diagram of a large diameter optical waveguide having two side holes that is the subject matter of the present invention.
Figure 2B:
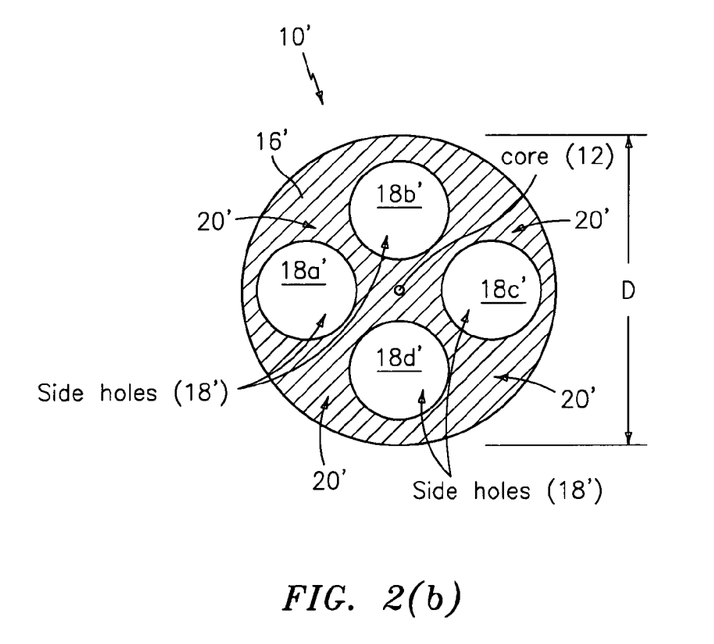
FIG. 2b is a diagram of another embodiment of a large diameter optical waveguide having four side holes that is the subject matter of the present invention.

FIGS. 2, 2a, 2b; The Large Diameter Optical Waveguide

FIG. 2 shows a large diameter optical waveguide generally indicated as 2 that is shaped like a dogbone and includes end regions or sections 2a having a wider cross-section with a diameter D of at least about 0.3 millimeters and an intermediate region or section 2b having a narrower cross-section with a Bragg grating 2c located in this region. The large diameter optical waveguide 2 (both with and without the dogbone shape) may be utilized in a variety of applications that require a tunable optical filter having Bragg gratings. These filtering devices are inherently sensitive to both the applied strain and temperature, both of which have been used successfully to precisely tune the filters. The large diameter optical waveguide or cane-based tunable device provides a high level of grating control by enabling precise grating tunability through compression tuning while maintaining high reliability in the overall device. One important feature of the cane-based tunable grating is its ability to tune over an extended region compared to a fiber technique. FIG. 2 shows the basic configuration of a cane-based tunable grating.

To extend the tuning range of such devices, a structural configuration must be created that gives the stability of the large diameter cane without the force associated with actuating such a device. One concept that can achieve this is known as "holey-cane" design or structural configuration, numerous examples of which are shown and described herein. All these examples are based on the principle that a large diameter cane will provide greater strength, so the overall diameter may be maintained, however, voids in the inner sections of the cane will not sacrifice strength while minimizing the amount of glass and therefore the force required to compress the device. In many of these cases it is not possible to place the cane core in the center of the piece, so it has to be located in alternate spots.

FIGS. 2a and 2b show two basic examples of "holey-cane" large diameter optical waveguide according to the present invention.

FIG. 2a: Two Side Holes

FIG. 2a shows a large diameter optical waveguide generally indicated as 10 having a cross-section with a diameter D of at least about 0.3 millimeters, that includes an inner core 12 with a Bragg grating 14 arranged therein, a cladding 16 surrounding the inner core 12, and a structural configuration generally indicated as 18 (FIG. 2a), 18' (FIG. 2b) for reducing the bulk modulus of compressibility and maintaining the anti-buckling strength of the large diameter optical waveguide.

In FIG. 2a, the structural configuration generally indicated as 18 has at least two side holes 18a, 18b arranged in relation to the core 12 for reducing the bulk modulus of compressibility and dimensioned for maintaining anti-buckling strength of the large diameter optical waveguide 10. The two side holes 18a, 18b are symmetrically arranged about the inner core 12 and form an overall symmetrical side hole structure. As shown, the two side holes 18a, 18b extend completely through the large diameter optical fiber and are circular in shape, although the scope of the invention is intended to include embodiments extending partially through the large diameter optical fiber or having other geometric shapes than those shown and described herein, including triangular, octagonal, etc.

In effect, the side holes 18a, 18b reduce the cane cross-sectional area and the amount of glass that needs to be compressed, while retaining the large diameter of the overall structure. Thus, the side holes 18a, 18b reduce the effective bulk modulus of compressibility of the large diameter optical waveguide or cane 10, which is defined as the ratio of volumetric stress (force per unit area) to the volumetric strain change in volume per unit volume. At the same time, the remaining material generally indicated as 20 in the cladding 16 surrounding side holes 18a, 18b provides good buckling strength to prevent buckling during compression. The scope of the invention is not intended to be limited to any particular dimension of the side holes 18a, 18b, and a person skilled in the art would appreciate without undue experimentation the necessary dimensioning thereof to maintain the anti-buckling strength of the large diameter optical waveguide 10.

In FIG. 2a, the side holes 18a, 18b are formed in the cladding 16; however, the scope of the invention is intended to include forming the side holes 18a, 18b in the outer shell (see FIG. 4) or a combination of the cladding 16 and the outer shell.

When compared to achieving a reduction in cross-sectional area by reducing the diameter of the cane 10, for example to a diameter of below 0.3 millimeters, the side hole approach produces a more robust design for increased tunability for the same compressive load.

FIG. 2b: Four Side Holes

FIG. 2b shows a large diameter optical waveguide or cane 10' having the structural configuration generally indicated as 18' that includes four side holes 18a', 18b', 18c', 18d' symmetrically arranged in a cladding 16' about the inner core 12. In FIGS. 2a and 2b similar parts are referenced by similar reference numerals. The four side holes 18a', 18b', 18c', 18d' may extend completely or partially through the large diameter optical waveguide 10'. Similar to that shown in FIG. 2a, the four side holes 18a', 18b', 18c', 18d' provide for a reduced bulk modulus of compressibility, while the remaining material generally indicated as 20' in the cladding 16' surrounding the side holes 18a, 18b maintains the anti-buckling strength of the large diameter optical waveguide 10'. The scope of the invention is not intended to be limited to any particular dimension of the four side holes 18a', 18b', 18c', 18d' and a person skilled in the art would appreciate without undue experimentation the necessary dimensioning thereof to maintain the anti-buckling strength of the large diameter optical waveguide 10'.

Figure 3:
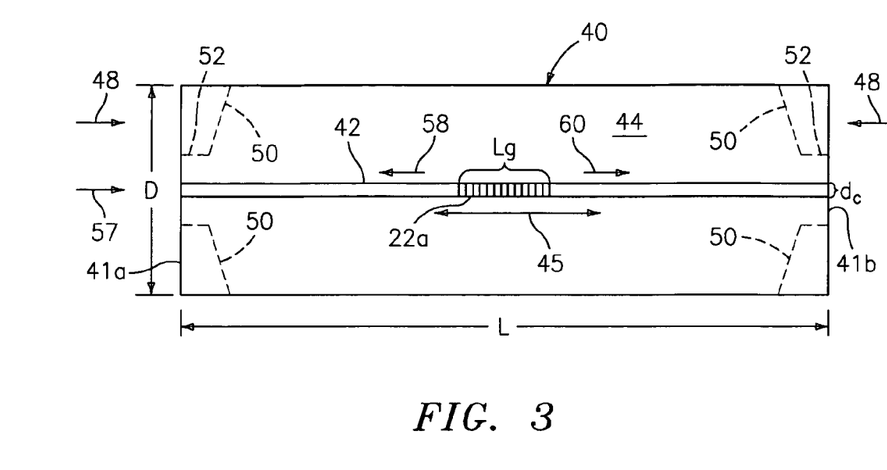
FIG. 3 is a diagram of a large diameter optical waveguide having a Bragg grating written therein.

FIG. 3: The Large Diameter Optical Waveguide

FIG. 3 shows a large diameter optical waveguide generally indicated as 40 (also known as a "cane"), which is an example of the structures 10 and 10' discussed above. The large diameter optical waveguide 40 has an inner core 42 and an outer cladding 44 surrounding the inner core 42, opposing ends 41a, 41b, and a diameter D of at least about 0.3 millimeters, similar to that disclosed in the aforementioned co-pending U.S. patent application Ser. No. 09/455, 868. The inner core 42 has a Bragg grating 22a written therein for tuning by applying a compressive force indicated by arrows 48 on the opposite ends 41a, 41b of the optical waveguide 40, or for sensing an external parameter like pressure applied thereon.

Cane waveguides have proven to be useful elements for creating highly reliable tunable grating based elements, and appear to be suitable for a variety of other applications.

One of the issues associated with the tuning of cane waveguides is the force required to tune a given cane element (typically formed in a "dogbone" element). Reducing the cane diameter can reduce the force required to tune a grating a given amount; however, the element will buckle at a lower compression strain, ultimately producing a lower tuning range.

The large diameter optical waveguide 40 comprises silica glass ($SiO_2$) based material having the appropriate dopants, as is known, to allow light indicated by arrow 45 to propagate in either direction along the inner core 42 and/or within the large diameter optical waveguide 40. The inner core 42 has an outer dimension $d_e$ and the large diameter optical waveguide 40 has an outer dimension D. Other materials for the large diameter optical waveguide 40 may be used if desired. For example, the large diameter optical waveguide 40 may be made of any glass, e.g., silica, phosphate glass, or other glasses; or solely plastic.

The outer dimension D of the outer cladding 44 is at least about 0.3 millimeters; and the outer dimension d, of the inner core 42 is such that it propagates only a few spatial modes (e.g., less than about 6). For example for single spatial mode propagation, the inner core 42 has a substantially circular transverse cross-sectional shape with a diameter $d_c$ less than about 12.5 microns, depending on the wavelength of light. The invention will also work with larger or non-circular cores that propagate a few (less than about 6) spatial modes, in one or more transverse directions. The outer diameter D of the outer cladding 44 and the length L have values that will resist buckling when the large diameter optical waveguide 40 is placed in axial compression as indicated by the arrows 48.

The large diameter optical waveguide 40 may be ground or etched to provide tapered (or beveled or angled) outer corners or edges 50 to provide a seat for the large diameter optical waveguide 40 to mate with another part (not shown herein) and/or to adjust the force angles on the large diameter optical waveguide 40, or for other reasons. The angle of the beveled corners 50 is set to achieve the desired function. Further, the large diameter optical waveguide 40 may be etched or ground to provide nubs 52 for an attachment of a pigtail assembly 54 (not shown herein) to the large diameter optical waveguide 40. Further, the size of the large diameter optical waveguide 40 has inherent mechanical rigidity that improves packaging options and reduces bend losses.

In the large diameter optical waveguide 40, the Bragg grating 22a is impressed (or embedded or imprinted) therein. A Bragg grating 22a, as is known, is a periodic or a periodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al.; and U.S. Pat. No. 5,388,173, entitled "Method and Apparatus for Forming Aperiodic Gratings in Optical Fibers", to Glenn, which are hereby incorporated by reference to the extent necessary to understand the present invention. The aperiodic variation of the gratings described herein may include a chirped grating. See also U.S. Pat. Nos. 5,042,897 and 5,061,032, both issued to Meltz et al., and hereby incorporated by reference in their entirety. As shown, the grating 22a is written in the inner core 42; however, the scope of the invention is intended to include writing the grating in the outer cladding 44, as well as a combination of the inner core 42 and the outer cladding 44, Any type of wavelength-tunable grating or reflective element embedded, etched, imprinted, or otherwise formed in the large diameter optical waveguide 40 may be used. The large diameter optical waveguide 40 may be photosensitive if the grating 22a is to be written into the large diameter optical waveguide 40. As used herein, the term "grating" means any of such reflective elements. Further, the reflective element (or grating) 22a may be used in reflection and/or transmission of light. The incoming light 57 incident on the grating 22a reflects a portion thereof as indicated by a line 58, and passes the remaining incident light 57 (within a predetermined wavelength range), as indicated by a line 60 (as is known).

The grating 22a has a grating length Lg, which is determined based on the application, and may be any desired length. A typical grating 22a has a grating length Lg in the range of about 3–40 millimeters. Other sizes or ranges may be used if desired. The length Lg of the grating 22a may be shorter than or substantially the same length as the length L of the large diameter optical waveguide 40. Also, the inner core 42 need not be located in the center of the large diameter optical waveguide 40 but may be located anywhere in the large diameter optical waveguide 40.

Accordingly, an outer diameter D of greater than about 400 microns (0.4 millimeters) provides acceptable results (without buckling) for a waveguide length L of 5 millimeters, over a grating wavelength tuning range of about 10 nm. For a given outer diameter D as the length L increases, the wavelength tuning range (without buckling) decreases Other diameters D for the large diameter optical waveguide 40 may be used depending on the overall length L of the large diameter optical waveguide 40 and the desired amount of compression length change $\Delta L$ or wavelength shift $\Delta \lambda$.

The large diameter optical waveguide 40 may be made using fiber drawing techniques that provide the resultant desired dimensions for the core and the outer diameter discussed hereinbefore. As such, the external surface of the large diameter optical waveguide 40 will likely be optically flat, thereby allowing Bragg gratings to be written through the cladding similar to that which is done for conventional optical fiber. Because the large diameter optical waveguide 40 has a large outer diameter compared to that of a standard optical fiber (e.g., 125 microns), the large diameter optical waveguide 40 may not need to be coated with a buffer and then stripped to write the gratings, thereby requiring less steps than that needed for conventional optical fiber gratings. Also, the large outer diameter D of the large diameter optical waveguide 40, allows the waveguide to be ground, etched or machined while retaining the mechanical strength of the large diameter optical waveguide 40. The large diameter optical waveguide 40 is easily manufacturable and easy to handle, and may be made in long lengths (on the order of many inches, feet, or meters) then cut to size as needed for the desired application.

Also, the large diameter optical waveguide 40 does not exhibit mechanical degradation from surface ablation common with optical fibers under high laser fluency (or power or intensity) during grating exposure (or writing). In particular, the thickness of the cladding between the cladding outer diameter and the core outer diameter causes a reduced power level at the air-to-glass interface for a focused writing beam.

The large diameter optical waveguide also reduces coupling between the core and cladding modes due to the increased end cross-sectional area between the core and cladding of the waveguide. Thus, the gratings 22a written in the inner core 42 of the large diameter optical waveguide 40 exhibit less optical transmission loss and exhibits a cleaner optical profile than a conventional fiber grating because the large cladding region dissipates coupled cladding modes, thereby reducing the coupling of the inner core 42 to the outer cladding 44 modes. In general, the greater the difference in the cross-sectional area between the inner core 42 and the outer cladding 44 the smaller the mode field overlap and the lower the coupling to the cladding modes. The thickness of the outer cladding 44 between the cladding outer diameter and the core outer diameter may be set to optimize this effect. Other diameters of the inner core 42 and the large diameter optical waveguide 40 may be used if desired such that the cladding modes are reduced to the desired levels.

The large diameter optical waveguide 40 may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

FIG. 4: Honeycomb Side Holes

FIG. 4 shows a large diameter optical waveguide or cane 10", having a honeycomb structural configuration generally indicated as 18" with a multiplicity of side holes 18a', 18b', etc. arranged in the cladding generally indicated as 16" about the core 12 and extending completely or partially through the large diameter optical waveguide 10". The multiplicity of side holes 18a', 18b', etc. are symmetrical arranged about the core 12. Similar to that shown in FIGS. 2a, 2b, the multiplicity of side holes 18a', 18b, etc. provide for a reduced bulk modulus of compressibility, while the remaining material generally indicated as 201" in the cladding 16" surrounding the multiplicity of side holes 18a', 18b', etc. maintains the anti-buckling strength of the large diameter optical waveguide 10". The scope of the invention is not intended to be limited to any particular dimension of the multiplicity of side holes 18a', 18b', etc. and a person skilled in the art would appreciate without undue experimentation the necessary dimensioning thereof to maintain the anti-buckling strength of the large diameter optical waveguide 10".

This geometry of the honeycomb structural configuration 18" can be fabricated using a solid preform element surrounded by multiple tubes arranged into a larger outer tube. The cross-section area in this case should be reduced by greater than 50%, giving rise to a highly robust tuning element.

FIGS. 5a, 5b, 5c, 5d: The Fin-Like Structures

FIGS. 5a, 5b, 5c, 5d show large diameter optical waveguides or canes 10a, 10b, 10c, 10d having two or more fin-like structures 18e, 18f, ..., 18m, 18n etched or ground from the cladding 16 and arranged and extending radially therefrom for providing a reduced bulk modulus of compressibility of the large diameter optical waveguides 10a, 10b, 10c, 10d and dimensioned for maintaining anti-buckling strength of the large diameter optical waveguides 10a, lob, 10c, 10d. The etched or ground away material reduces the bulk modulus of compressibility of the large diameter optical waveguide 1a, lob, 10c, 10d, while the fin-like structures 18e, 18f, ..., 18m, 18n maintain the anti-buckling strength of the large diameter optical waveguide 10a, 10b, 10c, 10d.

Figure 5A:
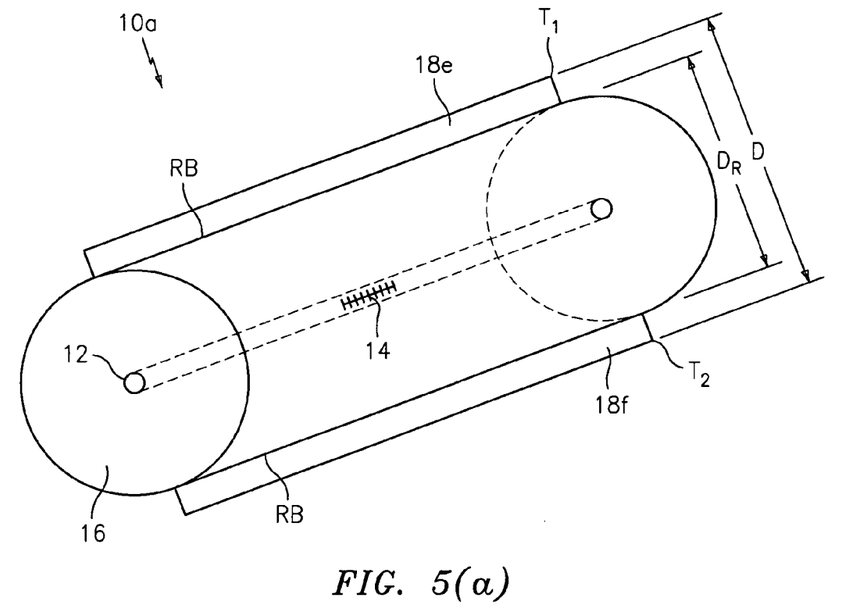
FIG. 5a is a diagram of another embodiment of a large diameter optical waveguide having two fins extending radially therefrom that is the subject matter of the present invention.

FIG. 5a: Fins Extending Along Cane

FIG. 5a shows the large diameter optical waveguide 10a having fin-like structures 18e, 18f etched or ground and extending radially from the cladding 16 and dimensioned for maintaining anti-buckling strength of the large diameter optical waveguide 10a. The fin-like structures 18e, 18f are symmetrically arranged about the inner core 12.

As shown, the large diameter optical waveguide 10a has a diameter D from the tip $T_1$ of one fin-like structure 18e to the tip $T_2$ of the other fin-like structure 18f, leaving the remaining body generally indicated as RB (indicated by the solid lines) of the large diameter optical waveguide 10a having a reduced diameter $D_R$ where the material was etched or ground away. The etched or ground material (not shown because it is etched or ground away) reduces the bulk modulus of compressibility of the large diameter optical waveguide 10a.

In FIG. 5a, the fin-like structures 18e, 18f extend axially along the entire length of the large diameter optical waveguide 10a and are dimensioned to maintain the anti-buckling strength of the large diameter optical waveguide 10a, 10b, 10c, 10d. The scope of the invention is not intended to be limited to any particular dimension of the fin-like structures 18e, 18f, and a person skilled in the art would appreciate without undue experimentation the necessary dimensioning thereof to maintain the anti-buckling strength of the large diameter optical waveguide 10a.

Figure 5B:
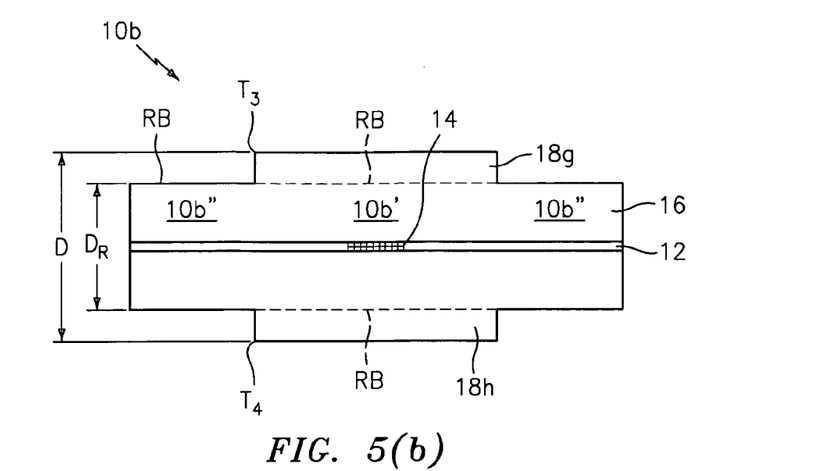
FIG. 5b is a diagram of another embodiment of a large diameter optical waveguide having two fins extending radially from a center section thereof that is the subject matter of the present invention.

FIG. 5b; Fins Partially Extending Along Cane

FIG. 5b shows the large diameter optical waveguide 10b having an intermediate section 10b' arranged between end sections 10b". The intermediate section 10b' has fin-like structures 18g, 18h etched or ground and extending radially from the cladding 16 and dimensioned for maintaining anti-buckling strength of the large diameter optical waveguide 10b. The fin-like structures 18g, 18h are symmetrically arranged about the inner core 12 and extend partially along the large diameter optical waveguide 10b.

As shown, the large diameter optical waveguide 10b has a diameter D from the tip $T_3$ of one fin-like structure 18g to the tip $T_4$ of the other fin-like structure 18h, leaving the remaining body generally indicated as RB (indicated by the dashed lines in the intermediate narrowed section) of the large diameter optical waveguide 10b having a reduced diameter DR where the material was etched or ground away. The etched or ground material (not shown because it is etched or ground away) reduces the bulk modulus of compressibility of the large diameter optical waveguide 10b. The scope of the invention is not intended to be limited to any particular dimension of the fin-like structures 18g, 18h, and a person skilled in the art would appreciate without undue experimentation the necessary dimensioning thereof to maintain the anti-buckling strength of the large diameter optical waveguide 10b.

Figure 5C:
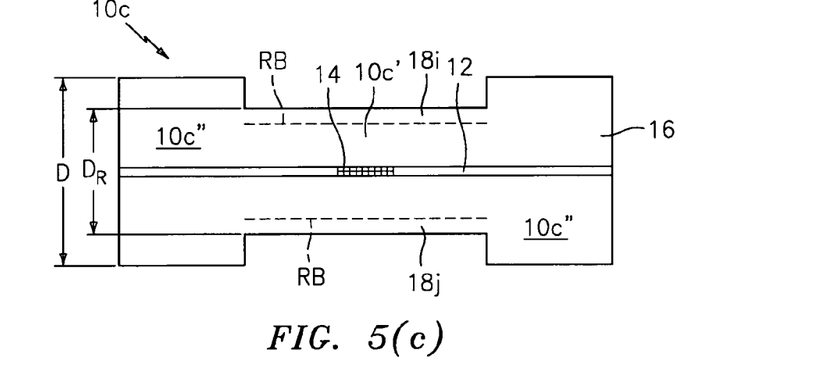
FIG. 5c is a diagram of another embodiment of a large diameter optical waveguide having two fins extending radially from a center section that is the subject matter of the present invention.

FIG. 5c: Fins Extending Along Intermediate Dogbone Section

FIG. 5c shows the large diameter optical waveguide 10c is shaped like a dogbone having a narrower intermediate section 10c' arranged between wider end sections 10c", and the narrower intermediate section 10c' has two fin-like structures 18i, 18j arranged thereon.

FIG. 5c shows the large diameter optical waveguide 10c having fin-like structures 18i, 18j etched or ground and extending radially from the cladding 16 of the narrower intermediate section 10c' of the large diameter optical waveguide 10c and dimensioned for maintaining anti-buckling strength of the large diameter optical waveguide 10c. The fin-like structures 18i, 18j are symmetrically arranged about the inner core 12 and extend partially along the large diameter optical waveguide 10c.

As shown, the large diameter optical waveguide 10c has a diameter D at the wider end sections 10c'', leaving the remaining body generally indicated as RB (indicated by the dashed lines in the intermediate narrowed section 10c') of the large diameter optical waveguide 10c having a reduced diameter $D_R$ where the material was etched or ground away. The etched or ground material (not shown because it is etched or ground away) reduces the bulk modulus of compressibility of the large diameter optical waveguide 10c. The scope of the invention is not intended to be limited to any particular dimension of the fin-like structures 18i, 18j, and a person skilled in the art would appreciate without undue experimentation the necessary dimensioning thereof to maintain the anti-buckling strength of the large diameter optical waveguide 10c.

Figure 5D:
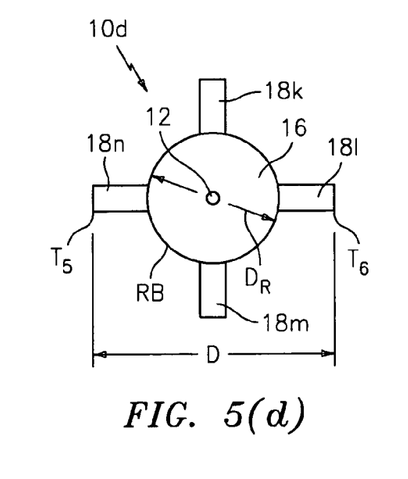
FIG. 5d is a diagram of another embodiment of a large diameter optical waveguide having four fins extending radially therefrom that is the subject matter of the present invention.

FIG. 5d: Fins Extending Along Cane

FIG. 5d shows the large diameter optical waveguide 10d having four fin-like structures 18k, 18l, 18m, 18n arranged thereon. The four fin-like structures 18k, 18l, 18m, 18n are etched or ground and extending radially from the cladding 16 and dimensioned for maintaining anti-buckling strength of the large diameter optical waveguide 10d. The four fin-like structures 18k, 18l, 18m, 18n are symmetrically arranged about the inner core 12 and extend completely or partially along the large diameter optical waveguide 10d.

As shown, the large diameter optical waveguide 10d has a diameter D from the tip $T_5$ and $T_6$ of fin-like structures 18l and 18n, leaving the remaining body generally indicated as RB of the large diameter optical waveguide 10d having a reduced diameter $D_R$ from the material etched or ground away. The etched or ground material (not shown because it is etched or ground away) reduces the bulk modulus of compressibility of the large diameter optical waveguide 10d. The scope of the invention is not intended to be limited to any particular dimension of the fin-like structures 18k, 18l, 18m, 18n, and a person skilled in the art would appreciate without undue experimentation the necessary dimensioning thereof to maintain the anti-buckling strength of the large diameter optical waveguide 10d.

Figure 5E:
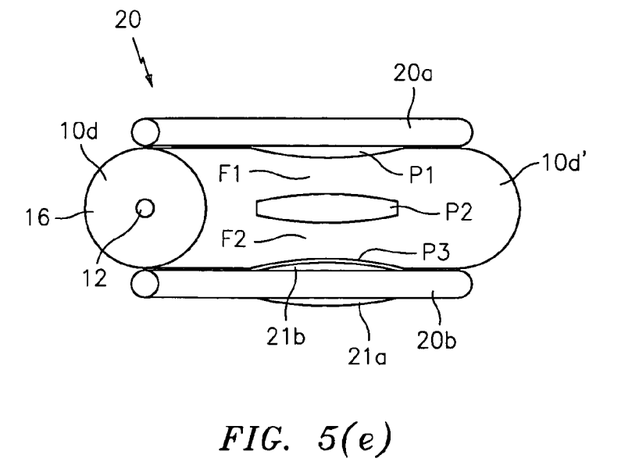
FIG. 5e is a diagram of a grinding wheel configuration for grinding a large diameter optical waveguide having fins extending radially therefrom that is the subject matter of the present invention.

FIG. 5e: Apparatus for Grinding Fins

FIG. 5e shows an apparatus generally indicated as 20 for grinding the fin-like structures shown in FIGS. 5a, 5b, 5c, 5d, including a roller 20a and a grinding roller 20b having grinding surfaces 21a, 21b. The large diameter optical waveguide 10d' is arranged between the roller 20a and the grinding roller 20b and shown with ground or etched away portions P1, P2, P3 and fin-like portions FP, F2.

Figure 6:
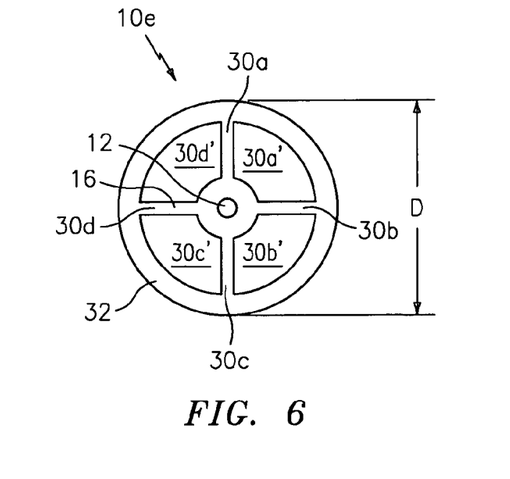
FIG. 6 is a diagram of a large diameter optical waveguide having a wagon wheel structure that is the subject matter of the present invention.

FIG. 6: Wagon Wheel Side Holes

FIG. 6 shows the large diameter optical waveguide 10e shaped like a wheel-like structure having two or more inner spoke sections 30a, 30b, 30c, 30d extending radially from the core 12 with non-circular openings 30a', 30b', 30c', 30d' therebetween and an outer rim section 32 circumferentially connecting the four inner spoke sections 30a, 30b, 30c, 30d. The four inner spoke sections 30a, 30b, 30c, 30d are symmetrically arranged about the inner core 12 and completely or extend partially along the large diameter optical waveguide 10e.

As shown, the large diameter optical waveguide 10e has a diameter D with an inner body having a reduced cross-section where the material was etched or ground away. The etched or ground material (not shown because it is etched or ground away) reduces the bulk modulus of compressibility of the large diameter optical waveguide 10e, while the four inner spoke sections 30a, 30b, 30c, 30d are dimensioned for maintaining anti-buckling strength of the large diameter optical waveguide 10e. The scope of the invention is not intended to be limited to any particular dimension of the four inner spoke sections 30a, 30b, 30c, 30d, and a person skilled in the art would appreciate without undue experimentation the necessary dimensioning thereof to maintain the anti-buckling strength of the large diameter optical waveguide 10e.

Figures 7, 7A, 7B, 7C:
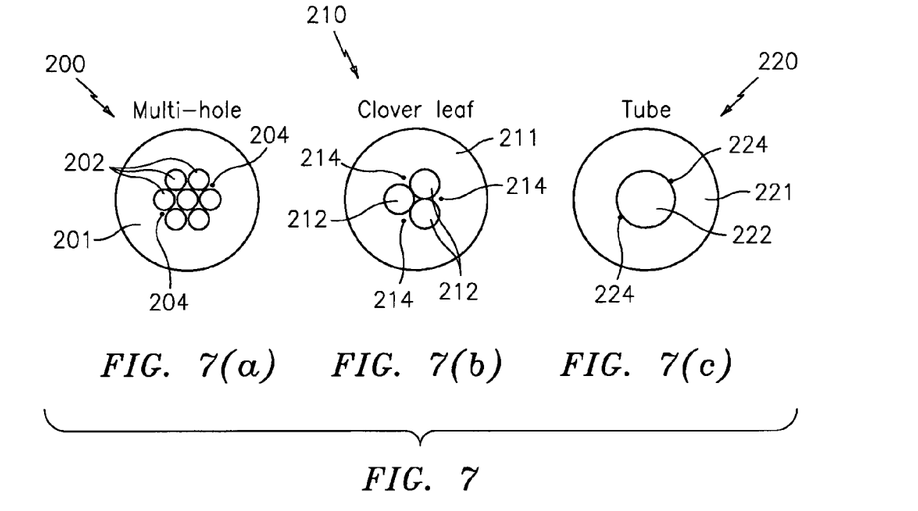
Figure 8:
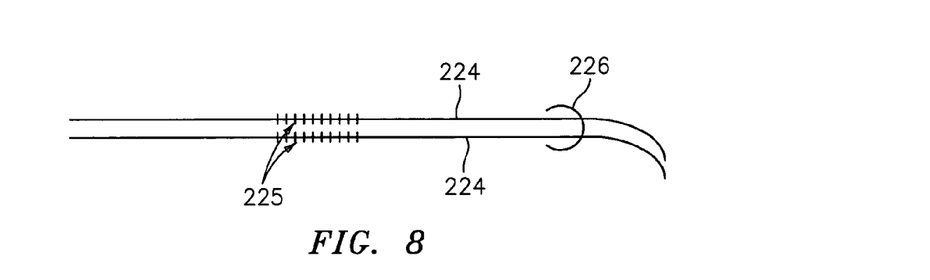
FIG. 8 is a diagram of a partial side view of the Bragg grating written in the large diameter optical waveguide shown in FIG. 7(c).
Figure 9:
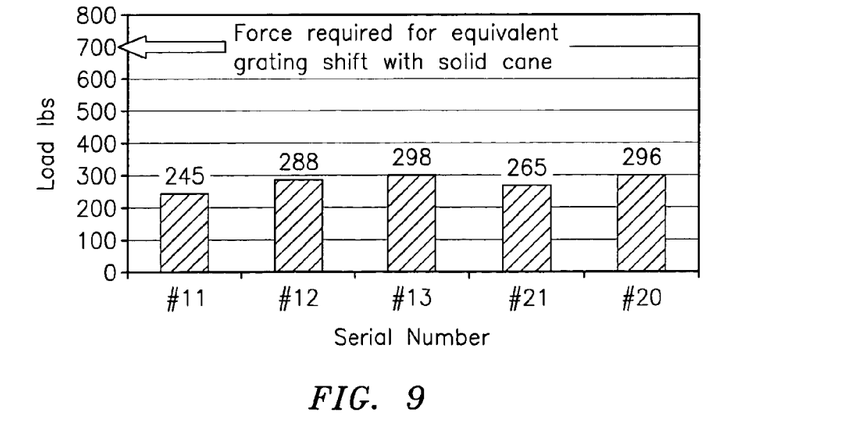
FIG. 9 is a graph of the force in pounds required to achieve a grating shift for five different tubular cane structures.

FIGS. 7–9: Multiple Off-Center Core Designs

FIG. 7 shows three different multiple off-center core designs or structural configurations.

FIG. 7(a) shows a large diameter optical waveguide generally indicated as 200 including a cladding 201 having multiple holes 202 with a honeycomb design or structural configuration and multiple cores 204 with Bragg grating (not shown) written therein. As shown, the multiple holes 202 include seven symmetrically arranged holes 202, and the multiple cores 204 include two cores symmetrically arranged about the seven holes 202, This configuration lends itself nicely to placement of multiple cores in the large diameter optical waveguide and has the advantage that multiple independent gratings can be located in a single piece of cane.

FIG. 7(b) shows a large diameter optical waveguide generally indicated as 210 including a cladding 211 having multiple holes 212 with a clover leaf design or structural configuration and multiple cores 214 with Bragg grating (not shown) written therein. The multiple holes 212 include three symmetrically arranged holes 212. The multiple cores 214 include three cores 214 symmetrically arranged about the holes 212.

FIG. 7(c) shows a large diameter optical waveguide generally indicated as 220 including a cladding 221 having a central hole 222 with a tubular design or structural configuration and multiple cores 224 with Bragg grating (not shown) written therein. The multiple cores 224 include one two cores 224 symmetrically arranged about the central hole 222.

The scope of the invention is not intended to be limited to the specific number of holes 202, 212, 222 or cores 204, 214, 224, or the arrangement of the same in relation to one another, for the designs shown in FIGS. 7(a), (b) and (c). Embodiments are envisioned having more or less holes 202, 212, 222 or cores 204, 214, 224, as well as different symmetrical and non-symmetrical arrangements of holes 202, 212, 222 and cores 204, 214, 224 in relation to one another, than that shown in FIGS. 7(a), (b) and (c). Embodiments are also envisioned having holes with different diameters, all holes do not have to be the same shape.

FIG. 8 shows the Bragg gratings 225 written in the large diameter optical waveguide 220 shown in FIG. 7(c). As shown, the two cores 224 can be addressed by two pigtails generally indicated as 226 attached to the end of the device 220. The tube cane design has been proven to provide over a 2.5 times improvement in performance over a solid cane. The large diameter waveguide may be compression tuned and used in a tunable bandpass filter as described in U.S. patent application Ser. No. 09/751,589, which is hereby incorporated by reference.

FIG. 9 shows a graph of buckling results of 5 tube cane pieces and compares those results to the force required for an equivalent grating shift with a solid cane at buckling. As shown, a substantial improvement in force is achieved using this "holey cane," technique. The benefits of this improvement can be realized in a number of ways in the design of the cane device. An extended tuning range, lower actuation forces and greater buckling safety factors can be traded off for optimum performance.

Various other structures can be created that accomplish the same objectives using these concepts. The scope of the invention is intended to include such various other structures.

The scope of the invention is intended to include embodiments using one core instead of multi-cores.

Figure 10A:
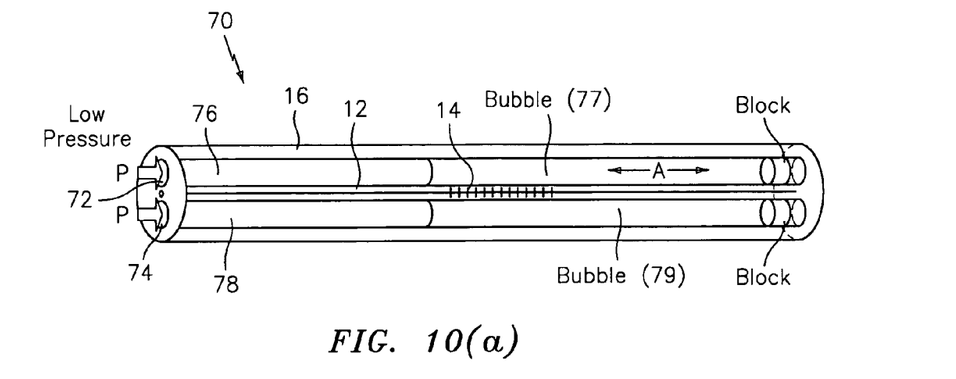
FIG. 10a is a diagram of a large diameter optical waveguide having two sides filled with a substance under low pressure that is the subject matter of the present invention.
Figure 10B:
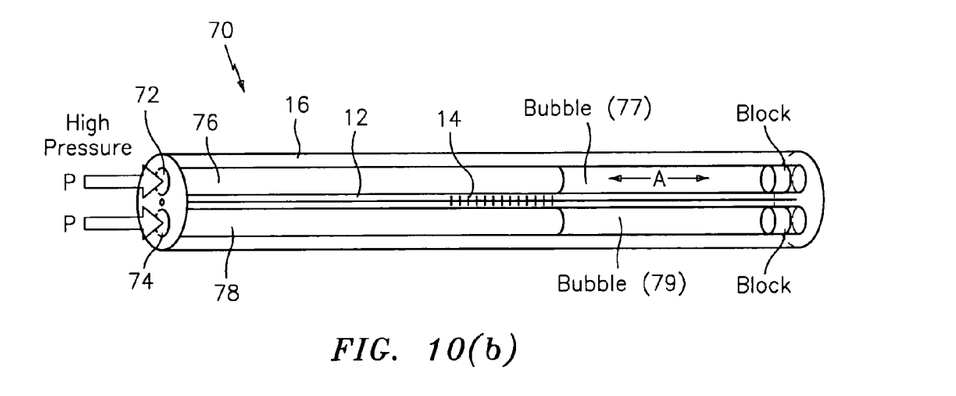
FIG. 10b is a diagram of a large diameter optical waveguide having two sides filled with a substance under high pressure that is the subject matter of the present invention.

FIGS. 10a, 10b: Low, High Pressure Fluid in Side Holes

FIGS. 10a, 10b show a large diameter optical waveguide 70 having an inner core 12 with a Bragg grating 14 therein and surrounded by a cladding 16 having two side holes 72, 74. The side holes 72, 74 are symmetrically located on either side of the core 12 and have substantially the same diameter.

FIG. 10(a) shows the large diameter optical waveguide 70 in a first state when a fluid 76, 78 at a low pressure is introduced or pumped into the side holes 72, 74, having a bubble or trapped air therein.

FIG. 10(b) shows the large diameter optical waveguide 70 in a second state when the pressure of the fluid is increased, such as by pumping, causing the bubble to compress thus changing the characteristics of the grating 14.

The large diameter optical waveguide 70 is similar to the waveguide 10 shown in FIG. 1a, except for the fact that the side holes 72, 74 are filled with fluids 76, 78. The scope of the invention is not limited to using the same fluid with and without bubbles or trapped air, because embodiments are envisioned in which different fluids or materials with different bulk moduli of compressibility are used.

In FIGS. 10(a), 10(b), the large diameter optical waveguide 70 is shown in a horizontal orientation, although a vertical orientation would typically be used with the fluid with the lower density rising to the top.

As shown, the side holes 72, 74 are close to the core 12 in the cane waveguide 70. The fluid in proximity to the core 12 and the grating 14 alters the effective waveguide index and thus the Bragg wavelength. The location of the bubble in relation to the location of the grating 14 changed the index of refraction, therefore changes the reflective wavelength of the grating 14. A fluidic pump (not shown) is used to change the pressure of the fluid to thereby shift the bubble position/compress bubble to tune/switch the grating wavelength. Compare FIGS. 10(a), 10(b).

The scope of the invention is not intended to be limited to any particular dimension of the side holes 72, 74, or fluids or materials used therein, and a person skilled in the art would appreciate without undue experimentation the necessary dimensioning thereof.

In FIGS. 10a, 10b, the side holes 72, 74 are shown plugged with a block 80 for the case where the side holes 72, 74 extend completely through the large diameter optical waveguide 70; however, embodiments are envisioned in which the side holes 72, 74 extend only partially through the large diameter optical waveguide 70 so no blocks are needed.

The scope of the invention is not intended to be limited to the size or shape of the side holes, nor the kind or type of fluid(s) contained therein. Embodiments are envisioned using air/air, air/liquid, liquid/liquid, etc.

Figure 11:
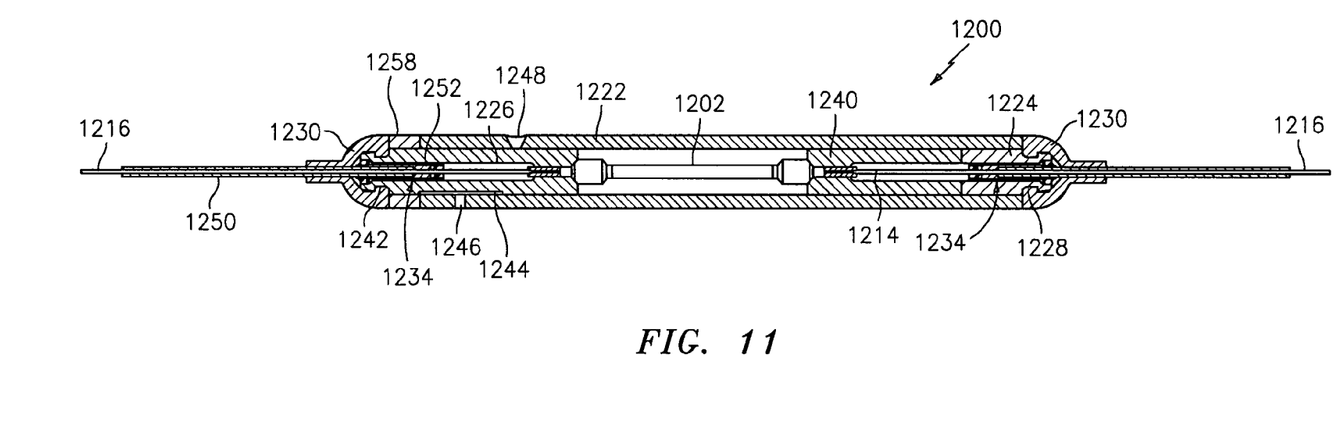
FIG. 11 shows an athermal embodiment of the present invention.

FIG. 11: An Athermal Embodiment

The scope of the invention is intended to include athermalizing the large diameter waveguide in the embodiment in FIG. 1, consistent with the athermalization technique described in U.S. patent application Ser. No. 09/699,940, and may be used together with the technology shown and described in patent application Ser. No. 10/098,925, which are both hereby incorporated by reference.

For example, FIG. 11 shows an athermal device or configuration 200 that can be used in conjunction with the present invention. The athermal device 1200 includes a optical waveguide 1202, attached pigtail assemblies 1214, and a compensating spacer or rod 1240, disposed in a tubular housing 1222 formed of a high strength metal or metal alloy material, preferably having a low CTE that is higher than silica. The athermal device is similar to that describe in U.S. patent application Ser. No. 09/699,940 entitled, "Temperature Compensated Optical Device", which is incorporated herein by reference.

A fixed end cap 1224 and an adjustable end cap 1226, which are formed of similar material as the housing are welded in respective ends of the housing 1222 to secure and maintain in axial alignment the optical waveguide and compensating spacer 1240. Both the fixed end cap 1224 and the adjustable end cap 1226 extend outward from the end of the housing 1222, and include a circumferential groove 1228 for receiving a respective strain relief boot 1230. Further, the fixed end cap 1224 and the adjustable end cap 1226 include a bore 1232 for receiving a respective strain relief device 1234 and for passing the optical fiber 1216 of the pigtail assemblies 1214 therethrough.

The compensating spacer or rod 1240 is disposed between the fixed end cap 1224 and the optical waveguide 1202. The spacer 1240 includes a stepped bore disposed axially for receiving the pigtail assembly 1214 therethrough. The stepped bore has a diameter greater than the inner portion of the bore of the spacer to assure that no contact occurs between the spacer and the fiber during expansion and contraction of the athermal device 1200.

The spacer 1240 is formed of a metal or metal alloy, such as steel, stainless steel, aluminum, high expansion alloy. The CTEs and lengths of the optical waveguide, the end caps and the spacer are selected such that the reflection wavelength of the grating 1204 does not substantially change over a predetermined temperature range (i.e., 100° C.). More specifically, the length of the spacer 1240 is sized to offset the upward grating wavelength shift due to temperature and the thermal expansion of the housing, waveguide and end caps. As the temperature increases, the spacer length expands faster than the optical waveguide, which shifts the grating wavelength down to balance the intrinsic wavelength shift up with increasing temperature. The length of the adjustable end cap is longer than the fixed end cap 1224.

Additionally, a pair of planar surfaces 1244 are ground or formed in the outer surface of the adjustable end cap 1226 to maintain the adjustable end cap in a fixed rotational orientation to the housing 1222 and optical waveguide 1202, during adjustment and mechanical burn-in process. The planar surfaces 1244 are spaced radially at a predetermined angle (e.g., 120 degrees) and extend axially a predetermined length (i.e., 0.290 in.) to permit axial movement while maintaining the adjustable end cap 1226 rotationally fixed. The planar surface align with a pair of holes 1246 disposed in the housing 1222, which are radially spaced 120 degrees. The holes 1246 in the housing 1222 receive a pair of spring loaded pins (not shown), which are disposed within a collar (not shown) mounted on the outer surface of the housing during assembly. The pins extend through the holes 1246 to engage the planar surfaces 1244 of the adjustable end cap 1226, while the collar temporarily clamps the housing to the adjustable end cap.

To complete the assembly of the athermal device 1200, a ring 1258, having a width substantially equal to the distance between the end of the housing 1222 and the strain relief boot 1230, is placed over the adjustable end cap 1226. The strain relief boots 1230, which are formed of a polymer (e.g., Santoprene), are then snap fit into the grooves 1228, 1242 of the end caps 1224, 1226.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein.

For example, although the invention is described in relation to long period gratings, the inventors envision other embodiments using blazed gratings, periodic or aperiodic gratings, or chirped gratings.

Embodiments are also envisioned in which a pair of gratings are used to provide a laser.

Although the invention has been described and illustrated with respect to exemplary embodiments thereof, the foregoing and various other additions and omissions may be made therein without departing from the spirit and scope of the present invention.

What is claimed is:

1. A tunable optical filter having a large diameter optical waveguide with a cross-section of at least about 0.3 millimeters;
   at least one inner core with a Bragg grating arranged therein;
   a cladding surrounding the at least one inner core;
   a structural configuration reducing the bulk modulus of compressibility and maintaining the anti-buckling strength of the large diameter optical waveguide;
   a housing for receiving the large diameter optical waveguide; and
   a piezoelectric transducer arranged in the housing for tuning the large diameter optical waveguide in response to a control signal.

2. A tunable optical filter according to claim 1, wherein the structural configuration forms at least one side hole arranged in relation to the core of the large diameter optical waveguide and dimensioned for maintaining anti-buckling strength of the large diameter optical waveguide.

3. A tunable optical filter according to claim 2, wherein the at least one side hole includes two or more side holes symmetrically arranged about the inner core.

4. A tunable optical filter according to claim 2, wherein the at least one side hole extends completely through the large diameter optical waveguide.

5. A tunable optical filter according to claim 2, wherein the at least one side hole extends partially through the large diameter optical waveguide.

6. A tunable optical filter according to claim 2, wherein the at least one side hole is circular.

7. A tunable optical filter according to claim 2, wherein the at least one side hole is non-circular.

8. A tunable optical filter according to claim 2, wherein the at least one side hole includes three or more side holes symmetrically arranged about the inner core.

9. A tunable optical filter according to claim 1, wherein the structural configuration includes a honeycomb structure having a multiplicity of side holes arranged about the core and extending through the large diameter optical waveguide.

10. A tunable optical filter according to claim 9, wherein the multiplicity of side holes are symmetrical arranged about the core.

11. A tunable optical filter according to claim 1, wherein the structural configuration forms at least two etched or ground fin-like structures extending radially from the core or cladding of the large diameter optical waveguide and dimensioned for maintaining anti-buckling strength of the large diameter optical waveguide.

12. A tunable optical filter according to claim 11, wherein the at least two fin-like structures are symmetrically arranged about the inner core.

13. A tunable optical filter according to claim 11, wherein the at least two fin-like structures extend completely along the large diameter optical waveguide.

14. A tunable optical filter according to claim 11, wherein the at least two fin-like structures extend partially along the large diameter optical waveguide.

15. A tunable optical filter according to claim 11, wherein the large diameter optical waveguide is shaped like a dog-bone having a narrower intermediate section arranged between wider end sections, and the narrower intermediate section has the at least two fin-like structures arranged thereon.

16. A tunable optical filter according to claim 11, wherein the at least two fin-like structures include four fin-like structures.

17. A tunable optical filter according to claim 1, wherein the structural configuration includes a wheel-like structure having two or more inner spoke sections extending radially from the core or cladding with openings therebetween and an outer rim section circumferentially connecting the inner spoke sections.

18. A tunable optical filter according to claim 17, wherein the two or more inner spoke sections include four inner spoke sections.

19. A tunable optical filter according to claim 1, wherein the structural configuration forms a symmetrical side hole structure.

20. A tunable optical filter according to claim 1, wherein the structural configuration forms an etched or ground structure.

21. A tunable optical filter according to claim 1, wherein the structural configuration is formed in the cladding.

22. A tunable optical filter according to claim 1, wherein the structural configuration reduces the cross-sectional area of the large diameter optical waveguide.

23. A tunable optical filter according to claim 1, wherein the at least one inner core includes a pair of inner cores symmetrically arranged about the structural configuration.

24. A tunable optical filter according to claim 23, wherein the pair of inner cores have a respective Bragg grating written therein.

25. A tunable optical filter according to claim 1, wherein the structural configuration includes a honeycomb of holes and the at least one core includes a pair of inner cores symmetrically arranged about the honeycomb of holes.

26. A tunable optical filter according to claim 1, wherein the structural configuration includes a clover leaf of three holes and the at least one core includes three inner cores symmetrically arranged about the clover leaf of holes.

27. A tunable optical filter according to claim 1, wherein the structural configuration includes a tubular hole and the at least one core includes a pair of inner cores symmetrically and diametrically arranged about the tubular hole.

28. A tunable optical filter according to claim 1, wherein the structural configuration includes four holes and the at least one core includes four inner cores symmetrically and diametrically arranged about the four holes.

29. A tunable optical filter according to claim 1, wherein the tunable optical filter comprises
  a housing for receiving the large diameter optical waveguide; and
  an actuator arranged in the housing for tuning the large diameter optical waveguide in response to a control signal.

30. A tunable optical filter according to claim 29, wherein the actuator includes a piezoelectric transducer for compressing the large diameter optical waveguide.

31. A tunable optical filter according to claim 1,
  wherein the large diameter optical waveguide is made of a material having an element coefficient of thermal expansion (CTE); and
  wherein the tunable optical filter includes a temperature compensated optical device, comprising:
  a spacer disposed adjacent to an axial end of said the large diameter optical waveguide and made of a spacer material having a spacer CTE that is larger than the element CTE;
  a housing arranged with said spacer and said the large diameter optical waveguide such that at least a portion of said spacer and said large diameter optical waveguide are in compression over an operational temperature range, said housing having a housing CTE that is less than said spacer CTE; and
  said characteristic wavelength changing less than a predetermined amount over said operational temperature range.

32. A tunable optical filter according to claim 31, wherein said housing comprises an end cap disposed adjacent to one axial end of said spacer.

33. A tunable optical filter according to claim 32, wherein said housing comprises an outer shell fused to said end cap at one axial end and fused to an opposite axial end of said large diameter optical waveguide.

34. A tunable optical filter according to claim 31, wherein at least a portion of the large diameter optical waveguide has a transverse cross-section which is continuous and is formed of substantially the same material.

35. A tunable optical filter according to claim 31, wherein said large diameter optical waveguide comprises:
  a grating embedded therein; and
  a tube, having said large diameter optical waveguide and said grating encased therein along a longitudinal axis of said tube, said tube being fused to at least a portion of said large diameter optical waveguide.

36. A tunable optical filter according to claim 31, wherein said grating is disposed in said optical waveguide.

37. A tunable optical filter according to claim 1, wherein the piezoelectric transducer axially compresses the large diameter waveguide.

* * * * *